United States Patent

Morita et al.

[11] Patent Number: 5,155,202
[45] Date of Patent: Oct. 13, 1992

[54] PHENOLIC NOVOLAK RESINS, CURED SUBSTANCES THEREFROM AND METHOD FOR PRODUCTION THEREOF

[75] Inventors: Hiromi Morita; Kazuyuki Murata; Ichiro Kimura, all of Takasaki; Susumu Nagao, Maebashi, all of Japan

[73] Assignee: Nippon Kayaku Kabushiki Kaisha, Tokyo, Japan

[21] Appl. No.: 651,361

[22] PCT Filed: Jun. 19, 1990

[86] PCT No.: PCT/JP90/00798

§ 371 Date: Feb. 6, 1991

§ 102(e) Date: Feb. 6, 1991

[87] PCT Pub. No.: WO90/15832

PCT Pub. Date: Dec. 27, 1990

[30] Foreign Application Priority Data

| Jun. 20, 1989 | [JP] | Japan | 1-155868 |
| Jul. 7, 1989 | [JP] | Japan | 1-173970 |
| Jul. 12, 1989 | [JP] | Japan | 1-177967 |
| Nov. 20, 1989 | [JP] | Japan | 1-299704 |
| Nov. 20, 1989 | [JP] | Japan | 1-299705 |
| Nov. 22, 1989 | [JP] | Japan | 1-302059 |

[51] Int. Cl.⁵ .............. C08G 65/08; C08L 61/14
[52] U.S. Cl. ..................... 528/97; 525/507; 528/129; 549/560; 549/517; 568/719
[58] Field of Search ......... 528/97, 129; 525/507; 549/560, 586; 568/717

[56] References Cited

U.S. PATENT DOCUMENTS 4,404,357 9/1983 Taylor et al. ............... 528/153
4,424,315 1/1984 Taylor et al. ............... 525/501
4,551,409 11/1985 Gulla et al. ................ 430/192
4,551,508 11/1985 Urasaki ...................... 525/507

FOREIGN PATENT DOCUMENTS 59-133218 7/1984 Japan.
59-230017 12/1984 Japan.
63-264622 1/1988 Japan.

Primary Examiner—John Kight, III
Assistant Examiner—Richard Lee Jones
Attorney, Agent, or Firm—Nields & Lemack

[57] ABSTRACT

A phenolic novolak resin comprising a compound represented by the general formula [I]:

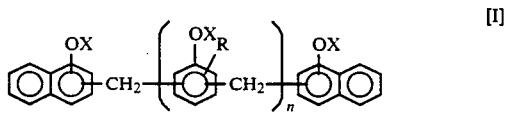

wherein X is H or

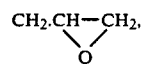

R is an alkyl group having 1 to 4 carbon atoms, and n is 1 to 10, particularly a phenolic novolak epoxy resin, and material, and a cured substance therefrom, and a process for producing the resin are disclosed. This resin is excellent in heat resistance and in reluctance to absorb water as compared with conventional phenolic resins, and useful in sealing electronic parts, molding, and laminating.

32 Claims, No Drawings

PHENOLIC NOVOLAK RESINS, CURED SUBSTANCES THEREFROM AND METHOD FOR PRODUCTION THEREOF

TECHNICAL FIELD

The present invention relates to resins having a higher heat resistance and lower water absorption, cured substances therefrom useful for materials to be used in sealing or laminating electronic parts, and a method for producing the same.

BACKGROUND ART

Conventionally resin compositions containing epoxy resins, phenolic novolak resins, and cure promoters have been extensively used in the field of electric and electronic parts, especially as sealants for IC. In recent years, however, development of electronic materials have led to high level of storage and packing densities which in turn require particularly a sealant to have a higher resistance to heat and a lower water absorption. Above all, severe conditions such as immersion in a soldering bath as conducted in providing high density packing have posed an increasing need for cured substances to have a higher resistance to heat and a lower water absorption. However, conventional compositions such as cresol novolak epoxide resins commonly used as epoxy resins have insufficient heat resistance under the severe condition of immersion in a soldering bath. Similarly, polyepoxide compounds produced by epoxidation of polyphenols which are produced by condensation of phenols and aromatic aldehydes having a phenolic hydroxyl group have been proposed as those having a heat resistance as disclosed in Japanese Patent KOKAI (Laid-open) No. Sho 63-264622. However, they are less preferred in water absorption than cresol novolak epoxide resins.

Japanese Patent KOKOKU (Post-Exam.) No. Sho 62-20206 proposes polyglycidyl ethers derived from condensation of α-naphthol and form aldehyde as resins capable of producing cured substances excellent in heat resistance. The polyglycidyl ethers are excellent for an increased resistance to heat imparted by incorporation of naphthalene rings, but suffer from higher softening points, or higher melt viscosities caused by the incorporation of naphthalene rings resulting in an disadvantage of poor workability.

On the other hand, phenolic novolak resins commonly used as curing agent are still unsatisfactory in heat resistance. An attempt has been made to enhance the heat resistance by reducing the content of lower molecular weight components (such as binuclear phenol novolaks) still resulting in unsatisfactory resistance under severer conditions (for example, immersion in a soldering bath).

DISCLOSURE OF THE INVENTION

The present invention provides a resin capable of producing cured substances which can withstand such severer conditions and exhibits higher resistance to heat and lower water absorption, and in addition has a good workability. The present inventors have discovered that introducing naphthol rings into epoxy resins and curing agents can achieve a higher resistance to heat and a lower water absorption as well as a good workability. The present invention has been accomplished based on such discovery.

That is, the present invention provides:

(1) a phenolic novolak resin comprising a compound represented by the general formula [I]:

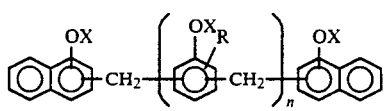

wherein X is H or

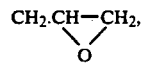

R is an alkyl group having 1 to 4 carbon atoms, and n is 1 to 10;

(2) a phenolic novolak resin according to the item (1) wherein the compound is a phenolic novolak compound represented by the general formula [II]:

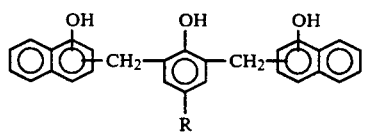

wherein R is an alkyl group having 1 to 4 carbon atoms;

(3) a phenolic novolak resin according to the item (2) wherein the compound is a phenolic novolak compound represented by the general formula [III]:

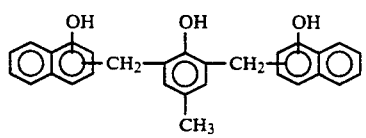

(4) a phenolic novolak resin according to the item (3) wherein the compound is a phenolic novolak compound represented by the general formula [IV]:

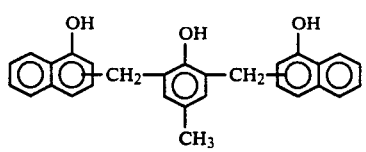

(5) a phenolic novolak resin according to the item (1) wherein the compound is a phenolic novolak compound represented by the general formula [V]:

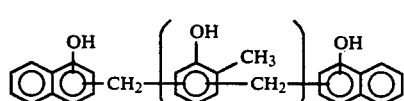

wherein m is 2 to 10;

(6) a phenolic novolak resin according to the item (5) wherein the compound is a phenolic novolak compound represented by the general formula [VI]:

[VI]

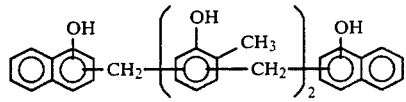

(7) a phenolic novolak resin according to the item (1) wherein the compound is a phenolic novolak epoxy compound represented by the general formula [VII]:

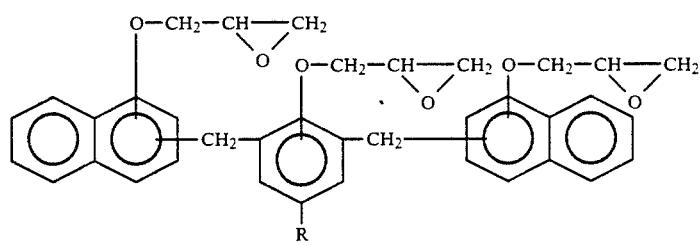

[VII]

wherein R is an alkyl group having 1 to 4 carbon atoms;

(8) a phenolic novolak resin according to the item (7) wherein the compound is a phenolic novolak epoxy compound represented by the general formula [VIII]:

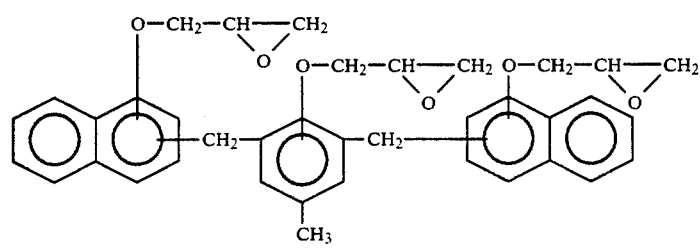

[VIII]

(9) a phenolic novolak resin according to the item (8) wherein the compound is a phenolic novolak epoxy compound represented by the general formula [IX]:

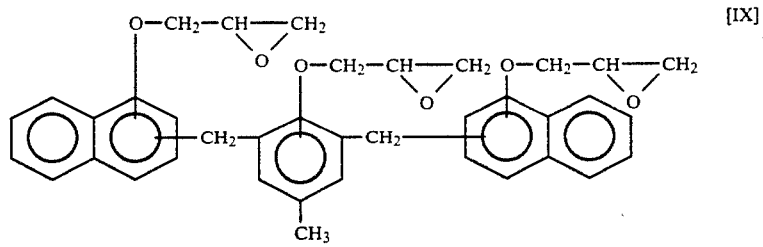

[IX]

(10) a phenolic novolak resin according to the item (1) wherein the compound is a phenolic novolak epoxy compound represented by the general formula [X]:

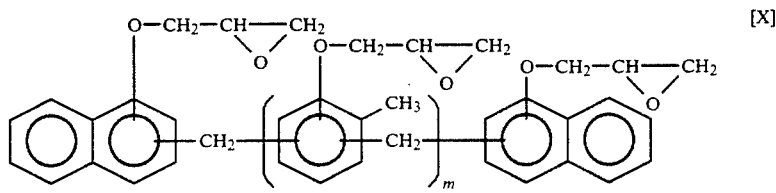

[X]

wherein m is 2 to 10;

(11) a phenolic novolak resin according to the item (10) wherein the compound is a phenolic novolak epoxy compound represented by the general formula [XI]:

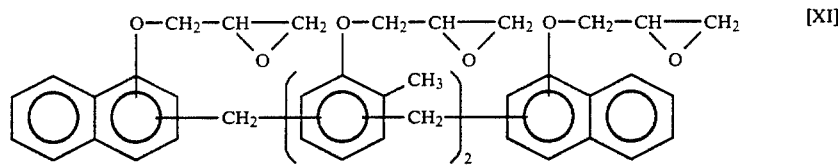

[XI]

(12) a phenolic novolak resin according to the item (3), (4), (6), (8), (9), or (11) comprising 30% by weight or more of the compound represented by the general formula [III], [IV], [VI], [VIII], [IX], or [XI];

(13) a cured substance from a phenolic novolak resin according to the item (1), (7), (8), (9), (10) or (11);

(14) a epoxy resin composition and a compound thereof comprising:

(a) a phenolic novolak epoxy resin as epoxy resin comprising a phenolic novolak epoxy compound represented by the general formula [XII]:

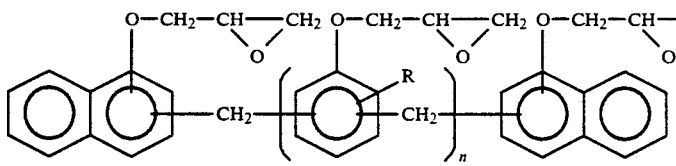

wherein R is an alkyl group having 1 to 4 carbon atoms, and n is 1 to 10, and (b) a curing agent;

(15) an epoxy resin composition and a cured substance therefrom comprising:

(a) an epoxy resin, and (b) a phenolic novolak resin as a curing agent comprising a phenolic novolak compound represented by the general formula [XIII]:

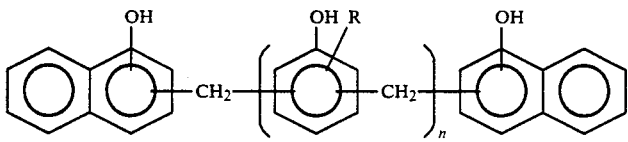

wherein R is an alkyl group having 1 to 4 carbon atoms, and n is 1 to 10;

(16) an epoxy resin composition and a cured substance therefrom comprising:

(a) a phenolic novolak resin as epoxy resin as recited in the item (14), and (b) a phenolic novolak resin as a curing agent as recited in the item (15);

(17) a process for producing a phenolic novolak compound represented by the general formula [II] as recited in the item (2), characterized in that said compound is produced by reacting a compound represented by the general formula [XIV]:

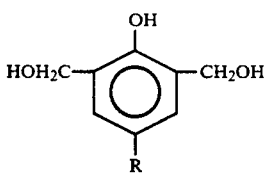

wherein R is an alkyl group having 1 to 4 carbon atoms, with a naphthol represented by the general formula [XV]:

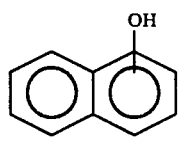

in the presence of an acid catalyst;

(18) a process for producing a phenolic novolak compound represented by the general formula [V] as recited in the item (5), characterized in that said compound is produced by reacting an o-cresol binuclear dimethylol compound represented by the general formula [XVI]:

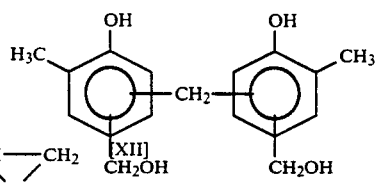

with a naphthol represented by the general formula [XV]:

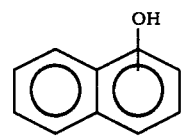

in the presence of an acid catalyst;

(19) a process for producing a phenolic novolak epoxy compound represented by the general formula [VII], characterized in that said compound is produced by reacting a phenolic novolak compound represented by the general formula [II] with an epihalide compound in the presence of an alkali; and

(20) a process for producing a phenolic novolak epoxy compound represented by the general formula [X], characterized in that said compound is produced by reacting a phenolic novolak compound represented by the general formula [V], with an epihalide compound in the presence of an alkali.

The phenolic novolak resins of the present invention are easy to handle and excellent in workability due to their lower softening point and lower melt viscosities. The cured substances produced therefrom have a higher glass transition temperature and higher heat distortion temperature, which are barometers of heat resistance, and can be allowed to have a lower water absorption than those of cured substances from the conventional resins. For example, the present invention provides the cured substances having a higher heat resistance and lower water absorption as compared with cured substances obtained from conventional phenolic resins.

Among others, the present compound represented by the general formula [I] can give a composition exhibiting good flow properties because it is terminated with naphthol rings capable of imparting heat resistance via e.g. cresol, and cured substances having a higher resistance to heat.

BEST MODE FOR CARRYING OUT THE INVENTION

The phenolic novolak resins according to the present invention comprise the compound having the general formula [I] preferably in an amount of not less than 30% by weight, more preferably not less than 35% by weight.

The phenolic novolak compounds represented by the general formula [XIII] and the phenolic novolak resins containing said compounds of the present invention may be produced as follows: that is, a compound represented by the general formula [XIV] or [XVI] is reacted with a naphthol represented by the general formula [XV] through dehydration-condensation in the presence of an acid catalyst.

The dimethylol compounds represented by the general formula [XIV] or [XVI] are preferably p-cresol dimethylol compounds, p-tert-butyl dimethylol compounds, and o-cresol binuclear dimethylol compounds, specifically most preferably p-cresol dimethylol compounds. The naphthols include $\alpha$-naphthol and $\beta$-naphthol, specifically preferably $\alpha$-naphthol. As the acid catalysts, hydrochloric acid, sulfuric acid, phosphoric acid, p-toluenesulfonic acid, oxalic acid, and the like may be used. Preferably, the acid catalysts are used in an amount of 0.1 to 30% by weight based on the weight of the compounds represented by the general formula [XIV] or [XVI]. The naphthols are preferably used in an amount of 2 to 15 times as much as the compounds represented by the general formula [XIV] or [XVI] in terms of mols. The reaction may be performed under no solvent condition, or in a solvent such as benzene, toluene, methylisobutylketone, and the like. The reaction temperature is preferably in a range of 20° to 150° C. After completion of the reaction, the used catalyst is removed out by e.g. washing with water, and the solvent as well as excess naphthols are removed by distillation under a reduced pressure to obtain the desired phenolic novolak compounds represented by the general formula [XIII] and the phenolic novolak resins containing said compounds.

The phenolic novolak resins of the present invention can be used mainly as curing agents for epoxy resins in a wide variety of areas in which high resistance to heat and low water absorption are required. In practice, the use in insulating materials, laminates, sealing materials and the like may be illustrated.

The phenolic novolak resins comprising the phenolic novolak compounds represented by the general formula [IV] are most preferred as curing agents.

The phenolic novolak epoxy compounds represented by the general formula [XII] and the phenolic novolak epoxy resins containing said compounds of the present invention may be produced as follows:

A phenolic novolak compound represented by the general formula [XIII], or a phenolic novolak resin containing said compound, preferably in an amount of 30% or more of said compound is reacted with an epihalogenide compound represented by the general formula [XVII]:

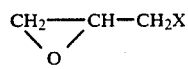 [XVII]

wherein X represents a halogen, in the presence of a basic compound, whereby they can be easily produced Halogen atoms represented by X in the general formula [XVII] include Cl, Br, I, and the like, and the compounds of the general formula [XVII] include practically epichlorohydrin, epibromohydrin, epiiodohydrin, and a mixture thereof to be useful, though epichlorohydrin is preferably employed in industry.

The reaction of the phenolic novolak compounds with epihalogenide compounds represented by the general formula [XVII] can be carried out by known techniques.

The phenolic novolak compound is reacted with an excess molar amount of the epihalogenide compound to an hydroxyl equivalent of the phenolic novolak compound in the presence of a quaternary ammonium salts such as tetramethyl ammonium chloride, tetramethyl ammonium bromide, triethyl ammonium chloride; or an alkali metal hydroxide such as sodium hydroxide, potassium hydroxide; or the like. In case the quaternary ammonium salts are employed, the reaction will be ceased in the stage of the ring-closing addition reaction which can be accomplished by further addition of the aforementioned alkali metal hydroxides.

Alternatively, the reaction may be effected with addition of alkali metal hydroxides initially to perform both ring-opening addition reaction and ring-closing one concurrently.

Amount of the epihalogenide compounds to be used is usually in the range of 1 to 50 mols, preferably 3 to 15 mols per hydroxyl equivalent of the phenolic novolak compounds.

In the above case, in order to effect the reaction smoothly, it is possible to employ non-protonic polar solvents such as alcohols, for example, methanol, or acetone, or dimethyl sulfoxide, with the use of dimethyl sulfoxide being specifically preferred.

Amount of the alkali metal hydroxides to be used is usually in the range of 0.8 to 1.5 mols, preferably 0.9 to 1.3 per hydroxyl equivalent of the phenolic novolak compounds, and when quaternary ammonium salts are used, its amount is usually in the range of 0.001 to 1 mol, preferably 0.005 to 0.5 mol per hydroxyl equivalent of the phenolic novolak compounds.

Reaction temperature is usually in the range of 30° to 130° C., preferably 40° to 120° C.

The reaction may be allowed to proceed while water produced in the reaction is being removed out the system.

After the reaction is completed, the by-product salts are removed by washing with water, filtration and the like and excess epihalogenide compounds are distilled out to obtain the phenolic novolak epoxy resins.

The phenolic novolak epoxy resins of the present invention can be used alone or in combination with other epoxy resins. In the case of combination, the phenolic novolak epoxy resins of the present invention should be preferably incorporated in an amount of 40% or more.

As other epoxy resins used in combination with the phenolic novolak epoxy resins of the general formula [XII], novolak epoxy resins are advantageous in view of resistance to heat. For example, there may be mentioned, but are not limiting to, cresol novolak epoxy resins, phenol novolak epoxy resins, and brominated phenol novolak epoxy resins. These may be used alone or in combination of two or more thereof.

Curing agents to be used in the present invention include, for example, novolak resins such as ordinary phenol novolak resins and cresol novolak resins, acid anhydrides such as hexahydrophthalic anhydride, and amine curing agents such as diamino-diphenylmethane, though curing agents of phenolic novolak resins comprising the phenolic novolak compounds of the general formula [XIII] may be used.

These curing agents may be used alone or in combination or two or more thereof. These curing agents are used in an amount of preferably 0.5 to 1.5 equivalents per epoxy equivalent of the epoxy resins present in the composition. Both cases of lower than 0.5 equivalent and conversely of higher than 1.5 equivalents may result in an reduction in resistance to heat.

Cure promoters include imidazole based compounds such as 2-methylimidazole and 2-ethylimidazole, tertiary amine based compounds such as 2-(dimethylaminomethyl)phenol, phosphine compounds such as triphenyl phosphine, and the like. The cure promoters are preferably, not necessarily, incorporated in an amount of 0.01 to 10 parts by weight based on 100 parts by weight of the epoxy resins (a) in the composition.

In addition, known additives may be incorporated, if necessary, which include, for example, inorganic fillers such as silica, alumina, talc, glass fibers, surface treating agents of fillers such as silane coupling agents, releasing agents, pigments, and the like.

The thus formulated composition is usually precured at a temperature of 150° to 180° C. for 30 to 300 seconds, and then post-cured at a temperature of 150° to 180° C. for 2 to 8 hours to allow the curing reaction to sufficiently proceed. The thus produced cured substances have a lower water absorption while retaining resistance to heat.

The resins and resin compositions of the present invention are useful in wide variety of applications where heat resistance and lower water absorption are required, practically in the applications of insulating materials, laminate sealing materials, molding materials, composite materials, and the like.

The present invention will be explained with reference to Examples below.

EXAMPLE 1

162 g (1.5 mols) of p-cresol, 90 g (3 mols) of paraformaldehyde, and 100 ml of water were charged in an one liter flask equipped with a thermometer, cooling pipe, dropping funnel, and stirrer, and stirred while blowing nitrogen.

120 g of a 15% aqueous solution of sodium hydroxide (0.45 mol as sodium hydroxide) were dropwise slowly added thereto at room temperature paying attention to heat build-up to ensure that the temperature of the liquid was not over 50° C.

Thereafter, the mixture was heated on an oil bath to 50° C. to react for 10 hours. At the end of the reaction, 300 ml of water were added to the reaction mixture which was cooled to room temperature, and neutralized with a 10% aqueous solution of hydrochloric acid, and then the precipitated crystals were removed by filtration. The resulting crystals were washed until the pH of the filtrate reaches 6 to 7, dried at a temperature of 50° C. under a reduced pressure (10 mmHg) to obtain 202 g of white crystalline p-cresol dimethylol compound (A).

168 g of the thus obtained white crystalline p-cresol dimethylol compound (A) were charged in a glass vessel equipped with a thermometer and stirrer, and thereto were added 1008 g of α-naphthol and 1500 ml of methyl isobutyl ketone, and stirred at room temperature under an atmosphere of nitrogen. Then, 1.7 g of p-toluenesulfonic acid were slowly added paying attention to heat build-up to ensure that the temperature of the liquid was not over 50° C.

After addition, the mixture was heated in an oil bath to 50° C. to react for 2 hours, and then transferred into a separating funnel to washed with water. The organic phase was washed with water until the discharged water became neutral, and thereafter, concentrated under a reduced pressure to obtain 370 g of a phenolic novolak (A1) to be used in the present invention. The product (A1) had a softening point of 112° C. (JIS K2425, a ring and ball test) and a hydroxyl equivalent of 138 (g/mol).

EXAMPLE 2

The same procedure as in Example 1 was repeated, except that 576 g of α-naphthol were employed to produce 368 g of a product (A2). The product (A2) had a softening point of 117° C. and a hydroxyl equivalent of 137.

EXAMPLE 3

The same procedure as in Example 1 was repeated, except that 432 g of α-naphthol were employed to produce 365 g of a product (A3). The product (A3) had a softening point of 118° C. and a hydroxyl equivalent of 137.

EXAMPLE 4

The same procedure as in Example 1 was repeated, except that 1008 g of β-naphthol were employed instead of α-naphthol to produce 371 g of a product (A4). The product (A4) had a softening point of 113° C. and a hydroxyl equivalent of 138.

GPC analysis indicated that the products (A1) to (A4) obtained in Examples 1 to 4 had a content of the phenolic novolak compounds represented by the general formula [III] as follows:

|      | Content of the compounds of the general formula [III] (wt. %) |
| ---- | ---- |
| (A1) | 79 |
| (A2) | 45 |
| (A3) | 36 |
| (A4) | 78 |

Conditions for the analysis were as follows:
Apparatus: GPC system manufactured by Tsushima Seisakusho, Ltd. (columns: one TSK-G-3000XL col.+two TSK-G-2000XL cols.)
Solvent: tetrahydrofuran 1 ml/min.
Detection: UV (245 nm)

Analysis of the products (A1), (A2), (A3), and (A4), by mass spectrometer (FAB-MS) indicated M+ 420, whereby it was confirmed that a major component was a compound having the following structure:

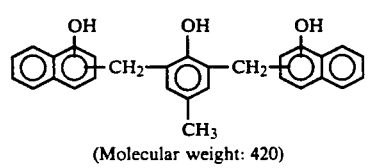

(Molecular weight: 420)

EXAMPLE 5

162 g (1.5 mols) of o-cresol, 90 g (3 mols) of paraformaldehyde, and 100 ml of water were charged in an one liter flask equipped with a thermometer, cooling pipe, dropping funnel, and stirrer, and stirred while blowing nitrogen.

50 g of a 15% aqueous solution of sodium hydroxide (0.19 mol as sodium hydroxide) were dropwise slowly added at room temperature paying attention to heat build-up to ensure that the temperature of the liquid was not over 50° C.

Thereafter, the mixture was heated in an oil bath to 50° C. to react for 10 hours. At the end of the reaction, 300 ml of water were added to the reaction mixture which was cooled to room temperature, and neutralized with a 10% aqueous solution of hydrochloric acid paying attention to heat build-up, and then the precipitated crystals were removed by filtration. The resulting crystals were washed until the pH of the filtrate reach 6 to 7, dried at a temperature of 50° C. under a reduced pressure (10 mmHg) to obtain 197 g of white crystalline binuclear o-cresol dimethylol compound (A).

197 g of the thus obtained white crystalline binuclear o-cresol dimethylol compound (A) were charged in a glass vessel equipped with a thermometer and stirrer, and thereto were added 995 g of α-naphthol and 1500 ml of methyl isobutyl ketone, and stirred at room temperature under an atmosphere of nitrogen.

Then, 2 g of p-toluenesulfonic acid were slowly added paying attention to heat build-up to ensure that the temperature of the liquid was not over 50° C. After addition, the mixture was heated to 50° C. in an oil bath to react for 2 hours, and then transferred into a separating funnel. After washed until the discharged water from the washing was neutral, the organic phase was concentrated under a reduced pressure to obtain 330 g of the phenolic novolak (A5) to be used in the present invention. The product (A5) had a softening point of 105° C. (JIS K2425, a ring and ball test) and a hydroxyl equivalent of 135 (g/mol).

EXAMPLE 6

The same procedure as in Example 5 was repeated, except that 400 g of α-naphthol were employed to produce 328 g of a product (A6). The product (A6) had a softening point of 118° C. and a hydroxyl equivalent of 134.

EXAMPLE 7

The same procedure as in Example 5 was repeated, except that 300 g of α-naphthol were employed to produce 332 g of a product (A7). The product (A7) had a softening point of 125° C. and a hydroxyl equivalent of 134.

EXAMPLE 8

The same procedure as in Example 5 was repeated, except that 995 g of β-naphthol were employed instead of α-naphthol to produce 331 g of a product (A8). The product (A8) has a softening point of 107° C. and a hydroxyl equivalent of 135.

GPC analysis indicated that the products (A5) to (A8) obtained in Examples 5 to 8 had contents of the phenolic novolaks represented by the general formula [V] with m=2, and binuclear o-cresols as follows:

| Product | Content of phenolic novolaks with m = 2 (wt. %) | Content of binuclear o-cresol (wt. %) | Average of m |
|---|---|---|---|
| (A5) | 82 | 0.5 | 2.4 |
| (A6) | 48 | 1.5 | 3.2 |
| (A7) | 37 | 1.3 | 3.7 |
| (A8) | 81 | 0.7 | 2.5 |

Conditions for the analysis were as follows:
Apparatus: GPC system manufactured by Shimadzu Seisakusho, Ltd. (Columns: one TSK-G-3000XL col. + two TSK-G-2000XL cols.)
Solvent: tetrahydrofuran 1 ml/min.
Detection: UV (245 nm)

Analysis of the product (A5), (A6), (A7), and (A8), by mass spectrometer (FAB-MB) indicated M+540, whereby it was confirmed that a major component was a compound having the following general formula:

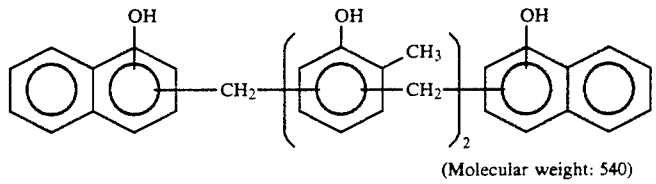

(Molecular weight: 540)

APPLICATION EXAMPLES 1 TO 10

One of the products (A1) to (A8) obtained in Examples 1 to 8 as curing agent, cresol novolak epoxy resin or bisphenol A epoxy resin as epoxy resin, and 2-methylimidazole as cure promoter were compounded in ratios as indicated in Table 1 (1) and (2) and cured to produce cured substances which were measured for glass transition temperature (Tg), heat distortion temperature (HDT) and water absorption.

Samples for measurement of glass transition temperature were prepared by kneading with rolls compositions formulated with the indicated ingredients in the amounts as shown in Table 1, (1) and (2) (numerals are by weight) at a temperature of 70 to 80° C. for 15 minutes, cooling and milling the resulting mixture, forming into tablets, molding by a transfer molding machine, and thereafter post-curing.

Conditions for measuring glass transition temperature, heat distortion temperature, water absorption, and post-curing were as follows:
Glass transition temperature:
  Measurement apparatus: Thermomechanical measurement apparatus (TMA) TM-7000 manufactured by Sinku Riko Co., Ltd.
  Rate of temperature increase: 2° C./min.
Heat distortion temperature:
  JIS K7207.
Water absorption:
  Specimen: Disk of 50 mm in diameter and 3 mm in thickness Condition: Proportion of water absorbed (% by weight) as a weight gain determined after boiling in water at a temperature of 100° C. for 50 hours.

Post-cure:

Temperature: 180° C.

Time period: 8 hours.

Characteristics of epoxy resins used such as a cresol novolak epoxy resin and bisphenol A epoxy resin were as follows:

Cresol novolak epoxy resin:

EOCN 1020 (manufactured by Nippon Kayaku Kabushiki Kaisha).

Epoxy equivalent: 200 g/mol.

Softening point: 65° C.

Bisphenol A epoxy resin:

EPOMIK R-301 (manufactured by Mitsui Petrochemical Industries, Ltd.)

Epoxy equivalent: 470 g/mol.

Softening point: 68° C.

Cured substances obtained by the aforementioned process were evaluated, and the results are shown in Table 1 (1) and (2).

APPLICATION COMPARATIVE EXAMPLES 1 AND 2

The same procedures as in Examples 1 to 10 were repeated, except that commercially available phenol novolak resins were incorporated as curing agents in the ratios as indicated in Table 1, to evaluate the resulting cured substances.

The evaluation results are shown in Table 1 (1).

Characteristics of the phenol novolak resin used were as follows:

A phenol novolak resin (manufactured by Nippon Kayaku Kabushiki Kaisha).

Hydroxyl equivalent: 106 g/mol.

Softening point: 85° C.

EXAMPLE 9

138 g of the product (A1) (hydroxyl equivalent, 138 g/mol) obtained in Example 1 and 460 g of epichlorohydrin were charged in an one liter reactor equipped with a thermometer, stirring device, dropping funnel, and product water separator, purged with nitrogen, and then 85 g of a 48% aqueous solution of sodium hydroxide were dropwise added thereto for 5 hours. During the dropwise addition, produced water and water of the aqueous solution of sodium hydroxide were continuously removed out of the reaction system as azeotrope with epichlorohydrin at a reaction temperature of 60° C. under a pressure of 100 to 150 mmHg with the epichlorohydrin being recirculated into the system.

Subsequently, excess unreacted epichlorohydrin was removed from the reaction mixture under reduced pressure, and thereafter, 500 ml of methyl isobutyl ketone was added to the reaction mixture which was washed with 100 ml of water until the aqueous phase exhibited neutral. Methyl isobutyl ketone phase was concentrated under reduced pressure, and then again added with 400 g of methyl isobutyl ketone to be redissolved.

To the resulting solution containing methyl isobutyl ketone were added 20 g of a 20% solution of sodium hydroxide, and reacted at a temperature of 70° C. for 2 hours. After the reaction, the resulting mixture was repeatedly washed with water to restore neutral.

Then, the methyl isobutyl ketone phase was concentrated under reduced pressure to obtain 170 g of a pale yellow solid (B1). The product (B1) had a softening point of 75° C. (JIS K2425) and an epoxy equivalent of 213 g/mol.

GPC analysis showed that the product (B1) contained 57% by weight of phenol novolak epoxy compound represented by the general formula [IX].

Analysis of the product (B1) by mass spectrometer (FAB-MS) indicated M+588, whereby it was con-

TABLE 1 (1)

| | | Application Example | | | | | Application Comparative Example | |
|---|---|---|---|---|---|---|---|---|
| | | 1 | 2 | 3 | 4 | 5 | 1 | 2 |
| Epoxy resin | EOCN 1020 | 200 | 200 | 200 | 200 | | 200 | |
| | EPOMIK R-301 | | | | | 470 | | 470 |
| Curing agent | Product (A1) | 138 | | | | 138 | | |
| | Product (A2) | | 137 | | | | | |
| | Product (A3) | | | 137 | | | | |
| | Product (A4) | | | | 138 | | | |
| | Phenol novolak resin | | | | | | 106 | 106 |
| Cure promoter (2-methylimidazole) | | 2.0 | 2.0 | 2.0 | 2.0 | 4.7 | 2.0 | 4.7 |
| Glass transition temperature (°C.) | | 182 | 181 | 175 | 182 | 142 | 162 | 125 |
| Heat distortion temperature (°C.) | | 201 | 199 | 192 | 200 | 153 | 178 | 130 |
| Water absorption (%) | | 1.1 | 1.2 | 1.2 | 1.1 | 1.2 | 2.0 | 1.4 |

TABLE 1 (2)

| | | Working Example | | | | |
|---|---|---|---|---|---|---|
| | | 6 | 7 | 8 | 9 | 10 |
| Epoxy resin | EOCN 1020 | 200 | 200 | 200 | 200 | |
| | EPOMIK R-301 | | | | | 470 |
| Curing agent | Product (A5) | 135 | | | | 135 |
| | Product (A6) | | 134 | | | |
| | Product (A7) | | | 134 | | |
| | Product (A8) | | | | 135 | |
| | Phenol novolak resin | | | | | |
| Cure promoter (2-methylimidazole) | | 2.0 | 2.0 | 2.0 | 2.0 | 4.7 |
| Glass transition temperature (°C.) | | 183 | 180 | 175 | 182 | 140 |
| Heat distortion temperature (°C.) | | 200 | 198 | 190 | 200 | 150 |
| Water absorption (%) | | 1.3 | 1.4 | 1.4 | 1.3 | 1.3 | firmed that a major component was a compound having the following structure:

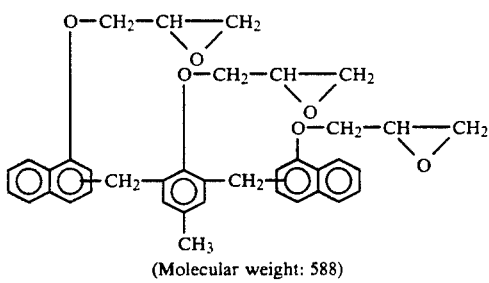

(Molecular weight: 588)

EXAMPLE 10

The same reaction as in Example 9 was duplicated, except that 137 g of the product (A2) obtained in Example 2 (hydroxyl equivalent, 137 g/mol.) was substituted for the product (A1), to produce 172 g of a product (B2). The product (B2) had a softening point of 89° C. and an epoxy equivalent of 215 g/mol.

The product (B2) was analyzed as in Example 9 indicating that it contained 37% by weight of phenolic novolak epoxy compound represented by the general formula [IX]. Analysis of the product (B2) by mass spectrometer (FAB-MS) indicated M+588.

EXAMPLE 11

The same reaction as in Example 9 was duplicated, except that 137 g of the product (A3) obtained in Example 3 (hydroxyl equivalent, 137 g/mol.) was substituted for the product (A1), to produce 170 g of a product (B3). The product (B3) had a softening point of 92° C. and an epoxy equivalent of 212 g/mol.

The product (B3) was analyzed as in Example 9 indicating that it contained 32% by weight of phenolic novolak epoxy compound represented by the general formula [IX]. Analysis of the product (B3) by mass spectrometer (FAB-MS) indicated M+588.

EXAMPLE 12

The same reaction as in Example 9 was duplicated, except that the product (A1) was replaced by 138 g of the product (A4) obtained in Example 4 (hydroxyl equivalent, 138 g/mol.), to produce 169 g of a product (B4). The product (B4) had a softening point of 96° C. and an epoxy equivalent of 214 g/mol.

The product (B4) was analyzed as in Example 9 indicating that it contained 55% by weight of phenolic novolak epoxy compound represented by the general formula [VIII]. Analysis of the product (B4) by mass spectrometer (FAB-MS) indicated M+588.

EXAMPLE 13

135 g of the product (A5) (hydroxyl equivalent, 135 g/mol) obtained in Example 5 and 460 g of epichlorohydrin were charged in an one liter reactor equipped with a thermometer, stirring device, dropping funnel, and product water separator, purged with nitrogen, and then 85 g of a 48% aqueous solution of sodium hydroxide were dropwise added thereto for 5 hours. During the dropwise addition, produced water and water from the aqueous solution of sodium hydroxide were continuously removed out of the reaction system as azeotrope with epichlorohydrin at a reaction temperature of 60° C. under a pressure of 100 to 150 mmHg with the epichlorohydrin being recirculated into the system.

Then, excess unreacted epichlorohydrin was removed from the reaction mixture under reduced pressure, and thereafter, 500 ml of methyl isobutyl ketone was added to the reaction mixture which was washed with 100 ml of water until the aqueous phase exhibited neutral. Methyl isobutyl ketone phase was concentrated under reduced pressure, and thereafter again added with 400 g of methyl isobutyl ketone to be redissolved.

To the resulting solution containing methyl isobutyl ketone were added 20 g of a 20% solution of sodium hydroxide, and reacted at a temperature of 70° C. for 2 hours. After the reaction, the resulting mixture was repeatedly washed with water to restore neutral.

Then, the methyl isobutyl ketone phase was concentrated under reduced pressure to obtain 165 g of a pale yellow solid (B5). The product (B5) has a softening point of 73° C. (JIS K2425) and an epoxy equivalent of 211 g/mol.

GPC analysis showed that the product (B5) contained 57% by weight of phenolic novolak epoxy compound represented by the general formula [X] with m=2.

Analysis of the product (B5) by mass spectrometer (FAB-MS) indicated M+ 764, whereby is was confirmed that a major component was a compound having the following structure:

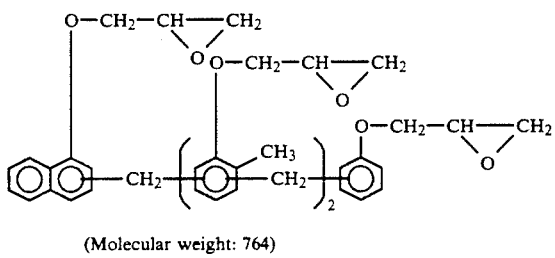

(Molecular weight: 764)

GPC analysis indicated the presence of 1.5% by weight of binuclear o-cresol epoxy resins.

EXAMPLE 14

The same reaction as in Example 13 was duplicated, except that 134 g of the product (A6) obtained in Example 6 (hydroxyl equivalent, 134 g/mol.) was substituted for the product (A5), to produce 167 g of a product (B6). The product (B6) had a softening point of 87° C. and an epoxy equivalent of 214 g/mol.

The product (B6) was analyzed as in Example 13 indicating that it contained 37% by weight of phenolic novolak epoxy compound represented by the general formula [X] with m =2. The content of binuclear o-cresol epoxy resins was 1.2% by weight. Analysis of the product by mass spectrometer (FAB-MS) indicated M+764.

EXAMPLE 15

The same reaction as in Example 9 was duplicated, except that 134 g of the product (A7) obtained in Example 7 (hydroxyl equivalent, 134 g/mol.) was substituted for the product (A5), to produce 165 g of a product (B7). The product (B7) had a softening point of 91° C. and an epoxy equivalent of 211 g/mol.

The product (B7) was analyzed as in Example 13 indicating that it contained 32% by weight of phenolic novolak epoxy compound represented by the general formula [X] with m=2. Binuclear o-cresol epoxy resins were present in an amount of 1.1% by weight. Analysis of the product by mass spectrometer (FAB-MS) indicated M+764.

EXAMPLE 16

The same reaction as in Example 13 was repeated, except that the product (A5) was replaced by 135 g of the product (A8) obtained in Example 8 (hydroxyl equivalent, 135 g/mol.), to produce 167 g of a product (B8). The product (B8) had a softening point of 75° C. and an epoxy equivalent of 212 g/mol.

The product (B8) was analyzed as in Example 13 indicating that it contained 55% by weight of phenolic novolak epoxy compound represented by the general formula [X] with m=2. Binuclear o-cresol epoxy resins were present in an amount of 1.4% by weight. Analysis of the product by mass spectrometer (FAB-MS) indicated M+764.

APPLICATION EXAMPLES 11 TO 22

One of the products (A5) to (A8) obtained in Examples 5 to 8 as curing agent, one of the products (B1) to (B8) obtained in Examples 9 to 16 as epoxy resin, and 2-methylimidazole as cure promoter were compounded in ratios as indicated in Table 2 (1) and (2), and cured to produce cured substances which were measured for glass transition temperature, heat distortion temperature and water absorption.

Samples for the measurements were prepared by kneading with rolls compositions formulated with the indicated ingredients in the amounts as shown in Table 2 (1) and (2) (numerals are by weight) at a temperature of 70° to 80° C. for 15 minutes, cooling and milling the resulting mixture, forming into tablets, molding by a transfer molding machine, and thereafter post-curing.

Conditions for measuring glass transition temperature, heat distortion temperature, water absorption, and post-curing were as defined above.

APPLICATION COMPARATIVE EXAMPLES 3 AND 4

Cured substances were evaluated as in Application Examples 11 to 22, except that a phenol novolak resin (H-1) as curing agent, a cresol novolak epoxy resin (EOCN1020) or a polyepoxy compound (EPPN502) of a polyphenol produced by condensation of an aromatic aldehyde and phenol as epoxy resin were compounded with 2-methylimidazole as cure promoter in the ratios as indicated in Table 2 (1), to evaluate the resulting cured substances.

The evaluation results are shown in Table 2 (1).

Characteristics of (H-1), (EOCN1020), and (EPPN502) mentioned above were as follows:

(H-1) : Phenol novolak resin manufactured by Nippon Kayaku Kabushiki Kaisha.
Softening point 85° C.
Hydroxyl equivalent 106 g/mol.

(EOCN-1020): Cresol novolak epoxy resin manufactured by Nippon Kayaku Kabushiki Kaisha.
Softening point 67° C.
Epoxy equivalent 200 g/mol.

(EPPN502) : Polyepoxy compound manufactured by Nippon Kayaku Kabushiki Kaisha.
Softening point 70° C.
Epoxy equivalent 168 g/mol.

TABLE 2 (1)

|  |  | Application Example |  |  |  |  |  | Application Comparative Example |  |
|---|---|---|---|---|---|---|---|---|---|
|  |  | 11 | 12 | 13 | 14 | 15 | 16 | 3 | 4 |
| Curing agent | Product (A1) | 65 |  |  |  | 65 |  |  |  |
|  | Product (A2) |  | 64 |  |  |  | 64 |  |  |
|  | Product (A3) |  |  | 65 |  |  |  |  |  |
|  | Product (A4) |  |  |  | 65 |  |  |  |  |
|  | H-1 |  |  |  |  |  |  | 53 | 63 |
| Epoxy resin | Product (B1) | 100 |  |  |  |  |  |  |  |
|  | Product (B2) |  | 100 |  |  |  |  |  |  |
|  | Product (B3) |  |  | 100 |  | 100 |  |  |  |
|  | Product (B4) |  |  |  | 100 |  | 100 |  |  |
|  | EOCN 1020 |  |  |  |  |  |  | 100 |  |
|  | EPPN 502 |  |  |  |  |  |  |  | 100 |
| Cure promoter | 2-methyl imidazole | 1.0 | 1.0 | 1.0 | 1.0 | 1.0 | 1.0 | 1.0 | 1.0 |
| Glass transition temperature (°C.) |  | 190 | 188 | 187 | 189 | 187 | 189 | 162 | 177 |
| Heat distortion temperature (°C.) |  | 232 | 230 | 219 | 235 | 229 | 229 | 178 | 213 |
| Water absorption (wt %) |  | 0.9 | 0.9 | 1.3 | 1.0 | 1.2 | 0.9 | 2.0 | 3.2 |

TABLE 2 (2)

|  |  | Working Example |  |  |  |  |  |
|---|---|---|---|---|---|---|---|
|  |  | 17 | 18 | 19 | 20 | 21 | 22 |
| Curing agent | Product (A5) | 64 |  |  |  | 64 |  |
|  | Product (A6) |  | 63 |  |  |  | 63 |
|  | Product (A7) |  |  | 64 |  |  |  |
|  | Product (A8) |  |  |  | 64 |  |  |
|  | H-1 |  |  |  |  |  |  |
| Epoxy resin | Product (B5) | 100 |  |  |  |  |  |
|  | Product (B6) |  | 100 |  |  |  |  |
|  | Product (B7) |  |  | 100 |  | 100 |  |
|  | Product (B8) |  |  |  | 100 |  | 100 |
|  | EOCN 1020 |  |  |  |  |  |  |
|  | EPPN 502 |  |  |  |  |  |  |
| Cure promoter | 2-methyl imidazole | 1.0 | 1.0 | 1.0 | 1.0 | 1.0 | 1.0 |
| Glass transition temperature (°C.) |  | 188 | 187 | 186 | 188 | 185 | 188 |
| Heat distortion temperature (°C.) |  | 230 | 228 | 215 | 233 | 227 | 227 |

TABLE 2 (2)-continued

| | Working Example | | | | | |
|---|---|---|---|---|---|---|
| | 17 | 18 | 19 | 20 | 21 | 22 |
| Water absorption (wt %) | 1.2 | 1.3 | 1.6 | 1.1 | 1.3 | 1.2 |

APPLICATION EXAMPLES 23 TO 30

One of the products (B1), (B2), (B4), (B5), (B6), and (B8) containing as major components phenolic novolak epoxy compounds obtained in Examples 9, 10, 12, 13, 14, 15, and 16, respectively was compounded with a phenol novolak (manufactured by Nippon Kayaku Kabushiki Kaisha, softening point: 85° C., hydroxyl equivalent: 105 g/mol) in the presence of 2-methylimidazole as catalyst in the ratios as shown in Table 3 (1) and (2), and cured under heat.

APPLICATION COMPARATIVE EXAMPLES 5 AND 6

Application Examples were repeated with heat curing, except that the products were replaced by a product (D1) obtained in Referential Example as described under and the following commercially available o-cresol novolak epoxy resin in the ratios as shown in Table 3 (1).

EOCN 1020 Manufactured by Nippon Kayaku Kabushiki Kaisha having an epoxy equivalent of 202 g/mol. and a softening point of 67° C.

The above cured substances were evaluated for glass transition temperature (Tg), heat distortion temperature (HDT), and water absorption, and the results are shown in Table 3 (1) and (2).

REFERENTIAL EXAMPLE 1

144 g of α-naphthol, 20 g of water and 1.6 g of oxalic acid were charged in a glass vessel equipped with a thermometer and stirrer, heated to 110° C. to melt, and added dropwise with 73 g of an aqueous solution of formalin (37%) for 30 minutes. The mixture was subsequently heated at the same temperature for 90 minutes, then raised up to 150° C., and reacted for further 120 minutes. Thereafter, the product was removed, ground, washed with hot water, and dried. The resulting novolak naphthol resin had a hydroxyl equivalent of 156 g/mol and a softening point of 175° C. GPC analysis indicated an average molecular weight of 730 (containing 4.7 molecules of naphthol component per molecule).

The same procedure as in Example 9 was repeated, except that 156 g of this novolak naphthol resins were employed instead of the product (A1), to obtain 195 g of polyglycidylether (D1). The polyglycidylether (D1) had a softening point of 120° C. and an epoxy equivalent of 270 g/mol.

TABLE 3 (1)

| | Softening point (°C.) | Melt viscosity*) (poise) | Application Example | | | Application Comparative Example | |
|---|---|---|---|---|---|---|---|
| | | | 23 | 24 | 25 | 5 | 6 |
| Phenol novolak | 85 | 2.1 | 105 | 105 | 105 | 105 | 105 |
| Product (B1) | 75 | 4.2 | 213 | | | | |
| Product (B2) | 89 | 9.5 | | 215 | | | |
| Product (B4) | 76 | 4.5 | | | 214 | | |
| Product (D1) | 120 | 20< | | | | 270 | |
| EOCN-1020 | 67 | 3.0 | | | | | 202 |
| 2-methyl imidazole | | | 2.1 | 2.1 | 2.1 | 2.7 | 2.0 |
| Curing conditions | | | 160° C. × 2 hr + 180° C. × 8 hr | | | | |
| Glass transition temperature (°C.) | | | 182 | 187 | 185 | 185 | 162 |
| Heat distortion temperature (°C.) | | | 203 | 207 | 205 | 198 | 178 |
| Water absorption | | | 1.0 | 1.1 | 1.1 | 1.7 | 2.0 |

*)ICI viscosity (150° C.)

TABLE 3 (2)

| | Softening point (°C.) | Melt viscosity*) (poise) | Application Example | | | | |
|---|---|---|---|---|---|---|---|
| | | | 26 | 27 | 28 | 29 | 30 |
| Phenol novolak | 85 | 2.1 | 105 | 105 | 105 | 105 | 105 |
| Product (B5) | 73 | 4.1 | 211 | | | 168 | 84 |
| Product (B6) | 87 | 9.2 | | 214 | | | |
| Product (B8) | 75 | 4.3 | | | 212 | | |
| EOCN 1020 | 67 | 3.0 | | | | 42 | 126 |
| 2-methyl imidazole | | | 2.1 | 2.1 | 2.1 | 2.1 | 2.1 |
| Curing conditions | | | 160° C. × 2 hr + 180° C. × 8 hr | | | | |
| Glass transition temperature (°C.) | | | 184 | 186 | 183 | 180 | 176 |
| Heat distortion temperature (°C.) | | | 200 | 203 | 201 | 195 | 187 |
| Water absorption | | | 1.8 | 1.6 | 1.8 | 1.8 | 1.8 |

*)ICI viscosity (150° C.)

INDUSTRIAL APPLICABILITY

As described above, the resins obtained in the present invention are easy in handling and excellent in workability due to their lower softening point and lower melt viscosities, and the cured substances produced from them are allowed to have a higher glass transition temperature and higher heat distortion temperature (which are barometers of resistance to heat), and lower water absorption than those obtained from conventional resins.

Therefore, the resins of the present invention can meet the latest need of heat resistance and low water absorption. Making use of these properties, they are quite useful in a wide variety of applications, practically employed as sealing materials for electronic parts, molding materials or laminate materials.

We claim:

1. A phenolic novolak resin comprising a compound represented by the general formula [I]:

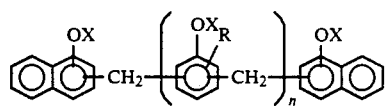  [I]

wherein X is H or

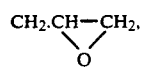

R is an alkyl group having 1 to 4 carbon atoms, and n is 1 to 10.

2. The phenolic novolak resin according to claim 1 wherein the compound is a phenolic novolak compound represented by the general formula (II);

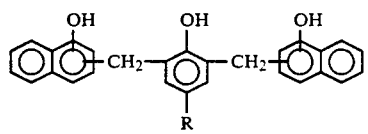  [II]

wherein R is an alkyl group having 1 to 4 carbon atoms.

3. The phenolic novolak resin according to claim 2 wherein the compound is a phenolic novolak compound represented by the general formula [III]:

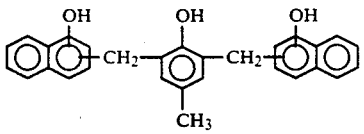  [III]

4. The phenolic novolak resin according to claim 1 3 wherein the compound is a phenolic novolak compound represented by the formula [IV]:

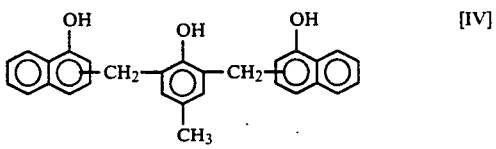  [IV]

5. The phenolic novolak resin according to claim 1 wherein the compound is a phenolic novolak compound represented by the general formula [V]:

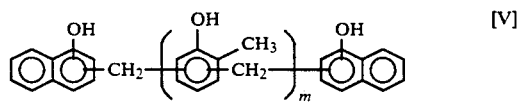  [V]

where m is 2 to 10.

6. The phenolic novolak resin according to claim 5 wherein the compound is a phenolic novolak compound represented by the general formula [VI]:

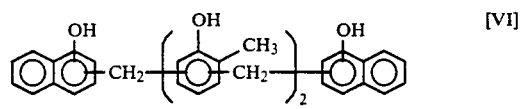  [VI]

7. The phenolic novolak resin according to claim 1 wherein the compound is a phenolic novolak epoxy compound represented by the general formula [VII]:

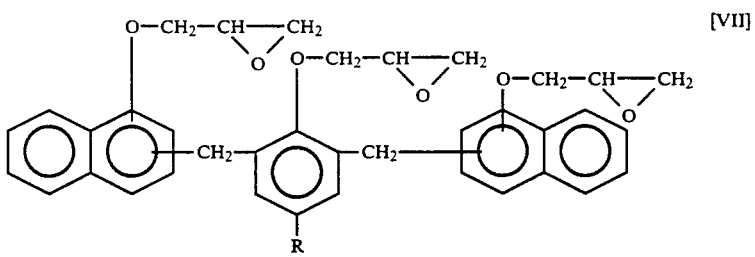  [VII]

where R is an alkyl group having 1 to 4 carbon atoms.

8. The phenolic novolak resin according to claim 7 wherein the compound is a phenolic novolak epoxy compound represented by the general formula [VIII]:

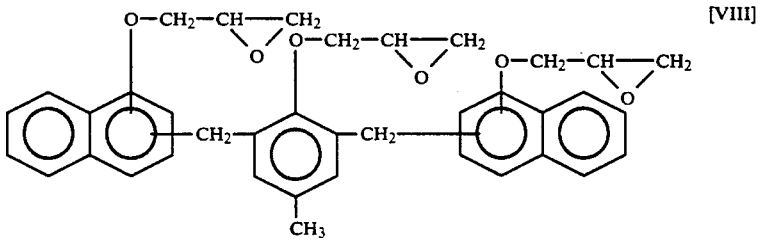  [VIII]

9. The phenolic novolak resin according to claim 8 wherein the compound is a phenolic novolak epoxy compound represented by the general formula [IX]:

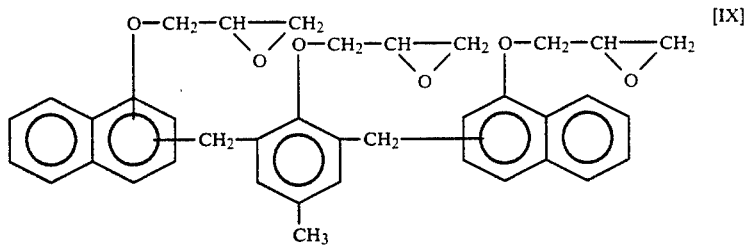

10. The phenolic novolak resin according to claim 1 wherein the compound is a phenolic novolak epoxy compound represented by the general formula [X]:

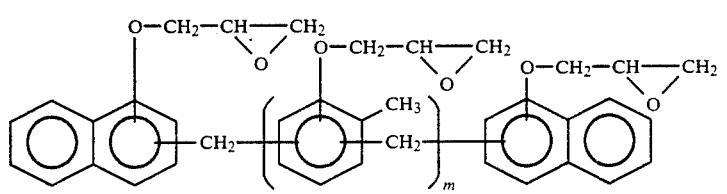

wherein m is 2 to 10.

11. The phenolic novolak resin according to claim 10 wherein the compound is a phenolic novolak epoxy compound represented by the general formula [XI]:

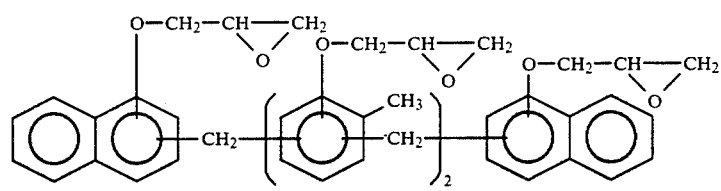

12. The phenolic novolak resin according to claim 3, 4, 6, 8, 9, or 11 comprising 30% by weight or more of the compound represented by the general formula [III], [IV], [VI], [VIII], [IX], or [XI] respectively.

13. A cured substance from the phenolic novolak resin according to claim 1, 7, 8, 9, 10, or 11.

14. An epoxy resin composition comprising:

(a) a phenolic novolak epoxy resin as epoxy resin comprising a phenolic novolak epoxy compound represented by the general formula [XII]:

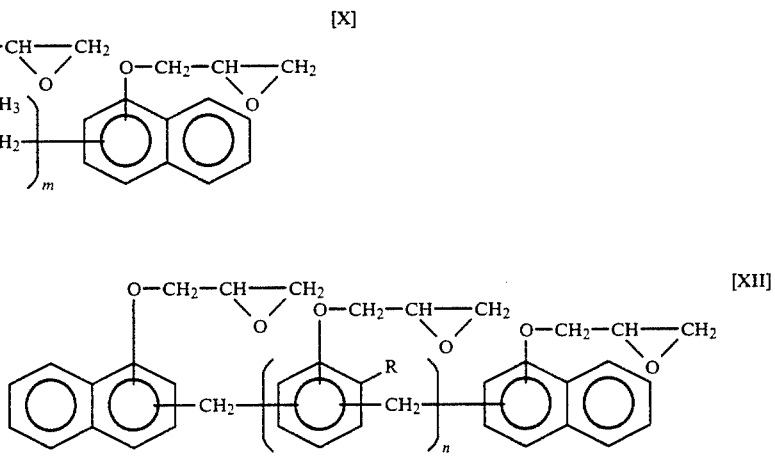

wherein R is an alkyl group having 1 to 4 carbon atoms, and n is 1 to 10, and

15. The epoxy resin composition according to claim 14 wherein the phenolic novolak epoxy compound is represented by the formula:

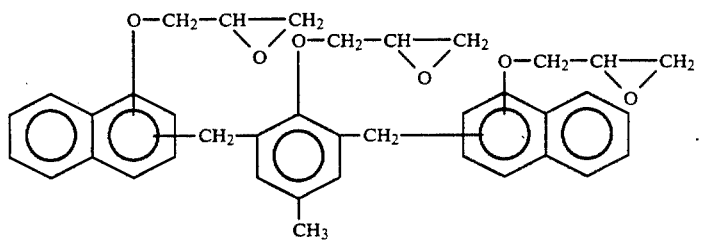

16. The epoxy resin composition according to claim 14 wherein the phenolic novolak epoxy compound is represented by the formula:

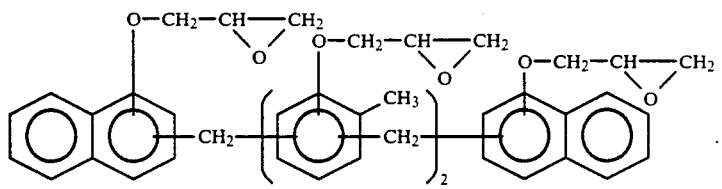

17. An epoxy resin composition comprising:
(a) an epoxy resin, and
(b) a phenolic novolak resin as curing agent comprising a phenolic novolak compound represented by the general formula [XIII]:

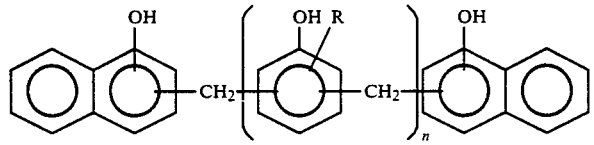

wherein R is an alkyl group having 1 to 4 carbon atoms, and n is 1 to 10.

18. The epoxy resin composition according to claim 17 wherein the curing agent is a phenolic novolak resin comprising a phenolic novolak compound represented by the formula:

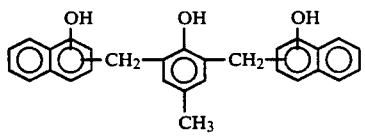

19. The epoxy resin composition according to claim 17 wherein the curing agent is a phenolic novolak resin comprising a phenolic novolak compound represented by the formula:

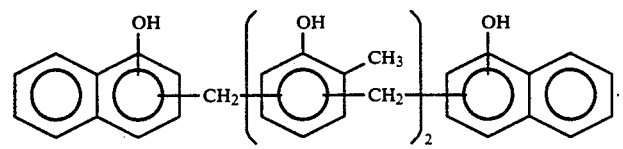

20. An epoxy resin composition comprising:
(a) as epoxy resin, a phenolic novolak epoxy resin comprising a phenolic novolak epoxy compound represented by the formula:

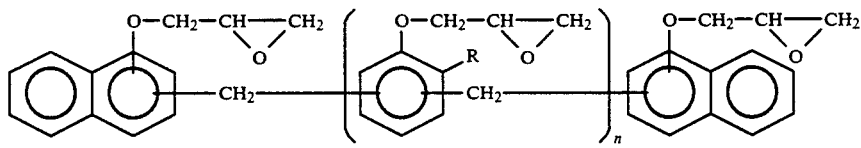

wherein R is an alkyl group having 1 to 4 carbon atoms, and n is 1 to 10, and (b) as curing agent, a phenolic novolak resin comprising a phenolic novolak compound represented by the formula:

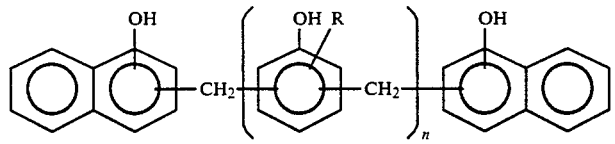

wherein R is an alkyl group having 1 to 4 carbon atoms, and n is 1 to 10.

21. The epoxy resin composition according to claim 20 wherein the phenolic novolak epoxy compound is represented by the formula:

23. The epoxy resin composition according to claim 20 wherein the phenolic novolak epoxy compound is represented by the formula:

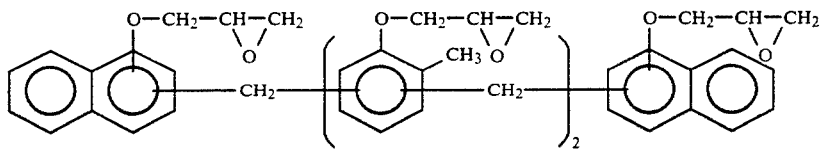

and the curing agent is the phenolic novolak resin comprising a phenolic novolak compound represented by the following formula:

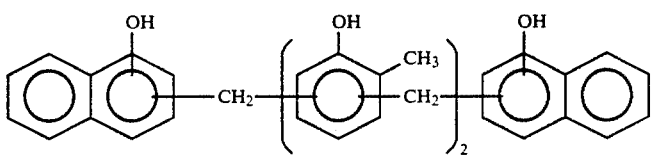

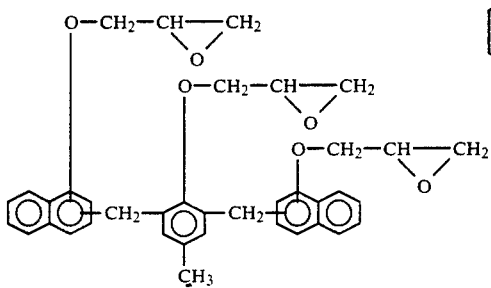

and the curing agent is the phenolic novolak resin comprising a phenolic novolak compound represented by the following formula:

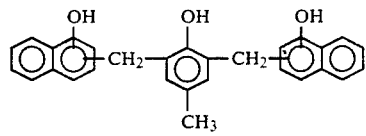

22. The epoxy resin composition according to claim 20 wherein the phenolic novolak epoxy compound is represented by the formula:

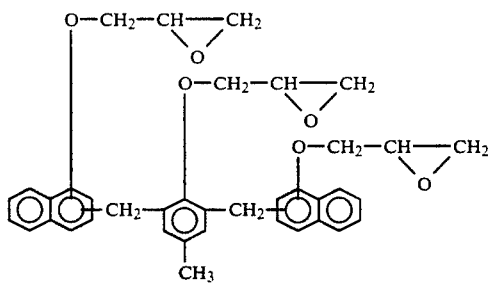

and the curing agent is the phenolic novolak resin comprising a phenolic novolak compound represented by the following formula:

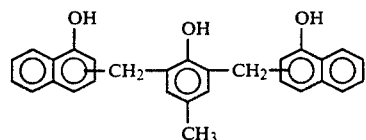

24. A cured substance from the epoxy resin composition according to claim 14, 15, 16, 17, 18, 19, 20, 21, 22, or 23.

25. A process for producing the phenolic novolak compound represented by the general formula [II] defined in claim 2, characterized in that said compound is produced by reacting a compound represented by the general formula [XIV]:

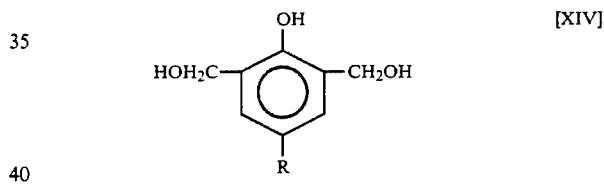

wherein R is an alkyl group having 1 to 4 carbon atoms, with a naphthol represented by the general formula [XV]:

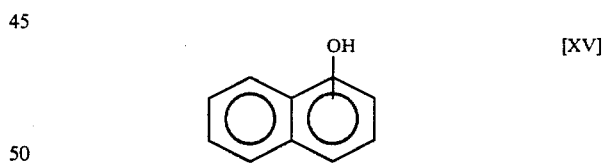

in the presence of the an acid catalyst.

26. A process for producing the phenolic novolak compound represented by the general formula [V] defined in claim 5, characterized in that said compound is produced by reacting an binuclear o-cresol dimethylol compound represented by the general formula [XVI]:

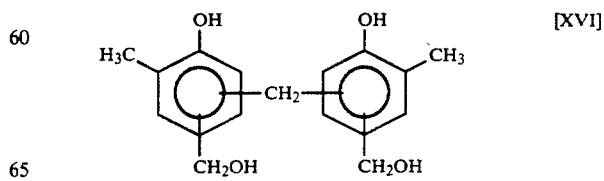

with a naphthol represented by the general formula [XV]: in the presence of an acid catalyst.

27. A process for producing the phenolic novolak epoxy compound represented by the general formula [VII], characterized in that said compound is produced by reacting the phenolic novolak compound represented by the general formula [II] with an epihalide compound in the presence of an alkali.

28. A process for producing the phenolic novolak epoxy compound represented by the general formula [X], characterized in that said compound is produced by reacting the phenolic novolak compound represented by the general formula [V] with an epihalide compound in the presence of an alkali.

29. The phenolic novolak resin according to claim 1 wherein X is

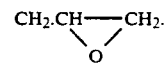

30. The phenolic novolak resin according to claim 8, 9 or 11 comprising 30% by weight or more of the compound represented by the general formula [VIII], [IX], or [XI] respectively.

31. A cured substance from the phenolic novolak resin according to claim 29.

32. A cured substance from the phenolic novolak resin according to claim 30.

* * * * *